(12) United States Patent
Cuppens et al.

(10) Patent No.: US 6,498,749 B1
(45) Date of Patent: Dec. 24, 2002

(54) DATA PROCESSING CIRCUIT WITH NON-VOLATILE MEMORY AND ERROR CORRECTION CIRCUITRY

(75) Inventors: Roger Cuppens, Eindhoven (NL); Marnix Claudius Vlot, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 40 days.

(21) Appl. No.: 09/702,389

(22) Filed: Oct. 31, 2000

(30) Foreign Application Priority Data

Nov. 1, 1999 (EP) .............................. 99203586

(51) Int. Cl.$^7$ .............................. G11C 16/06
(52) U.S. Cl. .................. 365/185.09; 365/201
(58) Field of Search ............. 365/185.09, 201; 714/766

(56) References Cited

U.S. PATENT DOCUMENTS

| 5,532,962 A | 7/1996 | Auclair et al. ............... 365/201 |
| 5,719,808 A | 2/1998 | Harari et al. ................. 365/185 |
| 6,131,177 A | * 10/2000 | Takeuchi ..................... 714/767 |

FOREIGN PATENT DOCUMENTS

| EP | 0392895 A2 | 10/1990 |
| EP | 0926687 A1 | 6/1999 |
| WO | 9620443 A1 | 7/1996 |

OTHER PUBLICATIONS

"VLSI Implementation of a Self–Checking Self–Exercising Memory System", by David A. Rennels et al., pp. 170–177.

* cited by examiner

*Primary Examiner*—A. Zarabian
(74) *Attorney, Agent, or Firm*—Aaron Waxler

(57) ABSTRACT

The data processing circuit contains a non-volatile memory. Error correction is provided for computing individual correction data for correcting an error in an individual data unit in the non-volatile memory. The individual correction data is computed from a combination of a plurality of data units read from the non-volatile memory. A correction data store stores the individual correction data. Memory access is signaled to the correction data store, which outputs data corrected according to the correction data when said individual data unit is read. The circuit comprises error correction trigger means for triggering the error correction computing means to perform said computing independent of reading of the individual data from the non-volatile memory.

7 Claims, 1 Drawing Sheet

DATA PROCESSING CIRCUIT WITH NON-VOLATILE MEMORY AND ERROR CORRECTION CIRCUITRY

BACKGROUND OF THE INVENTION

Non-volatile memories, like flash EEPROMs, are capable of retaining information indefinitely, also when the memory receives no power. Although information is retained indefinitely, some loss of information may still occur due to memory errors. Such errors will be small in number. Therefore it is possible to detect and correct these errors with a limited amount of redundant information for a large number of data units in the non-volatile memory. However, because redundant information is used for a large number of data units, detection and correction require reading a large number of data units from the memory.

U.S. Pat. No. 5,719,808 (Harari et al.) teaches a flash EEPROM circuit that corrects such errors. The flash EEPROM of Harari et al. operates in the manner of a disk drive, reading a file of data at a time. The memory contains EEPROM memory locations for the data of the file, EEPROM memory locations for a header of the file, a defect map and error correcting code data. Furthermore, spare memory locations are provided for corrected data for data units that have been found to be in error in the memory. The circuit uses DMA to transfers a series of data units from a file. At the start of DMA the circuit first loads the defect map into a defect pointer memory file. Subsequently the circuit reads successive data units from the file. If the defect map indicates that a data unit contains an error, the corrected data from a spare location is substituted for the data unit. Once a block of data has been read from the memory, the data from the block and the error correcting code data is used to locate and correct errors in the block. Information indicating the memory location that contains an error is stored in the defect map and the corrected information is stored in a spare memory location. When the memory location is accessed again in a subsequent DMA operation, the circuit notes from the defect map in the defect pointer memory file that the memory location is in error. In response thereto the circuit uses the corrected information from the spare memory location.

Harari et al. note that a flash EEPROM develops an increasing number of defects during its life cycle. Eventually these errors might overwhelm the error correcting capacity of the error correcting code. To prevent this from happening, Harari et al. correct errors each time the file is read and store corrected information when the errors are identified during reading a data block. Thus, the number of uncorrected errors will not usually becomes so large as to exceed the error correcting capacity of the error correcting code.

Harari et al. do not consider reading of data units outside the context of a file. Data units can only be read as part of a file. If a single data unit is needed, the error correcting code can be used only if a large amount of unnecessary information from the file is read together with the data unit.

SUMMARY OF THE INVENTION

Amongst others, it is an object of the invention to provide for correction of errors in a non-volatile memory were data units are randomly accessed during use, not as part of reading a whole file.

According to the invention, the circuit detects and corrects errors in the non-volatile memory autonomously from access to the memory by the processor for normal use the data. In addition, error correction may be triggered by read errors that occur when the processor accesses the memory to read data. Preferably the correction is triggered start-up of the circuit, or periodically during use, triggered like refresh cycles in a DRAM. Thus, error correction is performed during memory use and its activation does not depend on normal access to data units.

BRIEF DESCRIPTION OF THE DRAWING

These and other advantageous aspects of the data processing circuit according to the invention will be described using the following figure

DESCRIPTION OF THE PREFERRED EMBODIMENT

Figure 1:
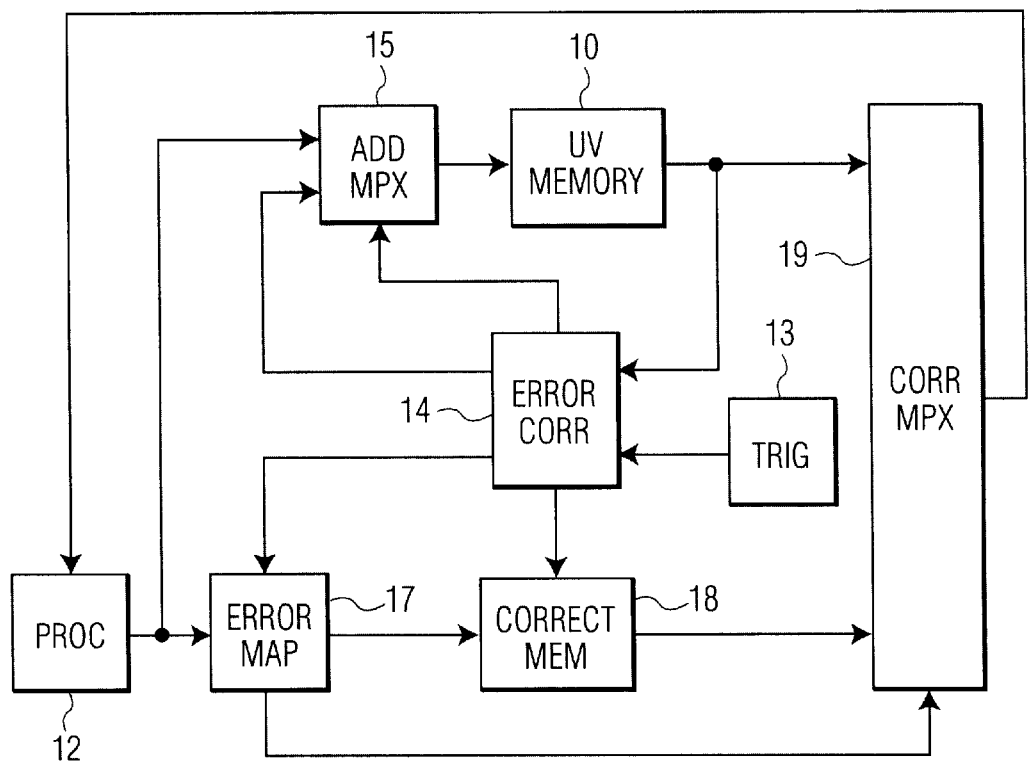
FIG. 1 shows a data processing circuit.

FIG. 1 shows a data processing circuit that contains a non-volatile memory 10, a microprocessor 12, a trigger circuit 13 an error correction circuit 14 an address multiplexer 15, an error mapping memory 17, a correction memory 18 and a correction multiplexer 19. The microprocessor 12 has an address output coupled to address multiplexer 15. Memory 10 has a data output coupled to microprocessor 12 via correction multiplexer 19 and a data input coupled to microprocessor 12 via data multiplexer 16. Error mapping memory 17 has an input coupled to the address output of microprocessor 12, a correction address output coupled to correction memory 18 and a control output coupled to correction multiplexer 19. Trigger circuit 13 has an output coupled to error correction circuit 14. Error correction circuit 14 has an address output coupled to an address input of memory 10 via address multiplexer 15, a data output coupled to correction memory 18 and an output coupled to error mapping memory 17.

In normal operation microprocessor 12 supplies addresses to memory 10, which in turn returns addressed data to microprocessor 12. Error mapping memory 17 compares each address issued by microprocessor 12 with the addresses for which error correction circuit 14 has signaled that corrected data is available. If the microprocessor has used an address in memory 10 for which corrected data is available, error mapping memory issues the corresponding address in the correction memory 18 and signals the correction multiplexer 19 to provide microprocessor 12 with the corrected data from error correction memory 18 instead of the data from memory 10. If no corrected data is available, error mapping memory 17 signals correction multiplexer 19 to provide microprocessor 12 with the data from memory 10.

Trigger circuit 13 triggers error correction circuit 14. Trigger circuit 13 can be triggered in various ways, for example when it is detected that a power supply voltage has started to be applied to the data processing circuit. Trigger circuit 13 may also be triggered periodically, using a timer circuit (not shown), or with a correct signal from microprocessor 12. Error correction circuit 14, when triggered by trigger circuit 13, reads data and error correction information from memory 10. Error correction circuit 14 detects errors and computes corrected data if necessary. To reduce the memory overhead for error correction information in memory 10, shared error correction information is provided for relatively large blocks of data. This means that the entire block and the error correction data needs to be read to detect whether there are errors and to determine how to correct them. In a matrix code for example, the data is logically organized in rows and columns of bits, parity data is provided to detect individual rows and columns that contain errors; erroneous data is located at the intersection of rows and columns that contain errors. The whole matrix and any parities need to be read to detect and correct the errors. Error correction circuit 14 writes the corrected data into correction memory 18. Error correction circuit 14 also writes information into error mapping memory 17, specifying the address of the corrected data in memory 10 and correction memory 18.

Error correction using error correction information from memory 10 will take much more time than reading individual data. Performing error correction with such correction information for a large block would therefore cause enormous overhead if used for reading individual data. Therefore, during individual read operations errors are corrected, if possible, using error mapping memory 17 and error correction memory 18, not with error correction information from memory 10. The error correction information from memory 10 is used only asynchronously of normal use during programs that access individual memory locations (i.e. in correction operations that may run independent of such programs).

In an embodiment, the memory 10 may contain information that enables detection, but not correction, of errors in individual data units from a data unit read in an individual access operation (for example a parity bit). This allows the processor to start an error correction operation using error correction information for a block of data if an error is detected. By running error correction regularly (e.g. during reset, or during start up, or periodically) the need for such a "run-time" correction is minimized.

Microprocessor 12 may have an inhibit output (not shown) coupled to trigger circuit 13 to inhibit triggering of error correction when the microprocessor 12 is handling events that must be handled with real time constraints. Alternatively or in addition, address multiplexer 15 may give access to memory 10 from microprocessor 12 precedence over access from error correction circuit 14.

The circuit of FIG. 1 may be integrated in a semiconductor device. The microprocessor 12 may be internal or external to this device. The function of trigger circuit 13 and error correction circuit 14 may be implemented alternatively with a computer program executed by microprocessor 12. Execution of this program may be initiated independent of access to memory locations by normal programs of the microprocessor, for example in response to periodic interrupts, or on (power on) reset of the microprocessor 12.

What is claimed is:

1. A data processing circuit comprising a non-volatile memory;

error correction computing means for computing individual correction data for correcting an error in an individual data unit during individual read operations in the non-volatile memory, the individual correction data being computed from a combination of a plurality of data units read form the non-volatile memory;

a correction data store for storing the individual correction data, a memory access unit being coupled to the correction data store, for outputting data corrected according to the correction data when said individual data unit is read;

error correction trigger means for triggering the error correction computing means to perform said computing independent of reading of the individual data from the non-volatile memory.

2. A data processing circuit according to claim 1, having a reset circuit for resetting the circuit to an initial state that precedes normal data-processing, the error correction trigger means being triggered by said resetting.

3. A data processing circuit according to claim 2, wherein said reset circuit is activated by a start of supplying power to the circuit.

4. A data processing circuit according to claim 1, comprising a timer circuit for periodically activating said error correction trigger means during operation of the circuit.

5. A data processing circuit according to claim 1 contained in a package that has an external pin coupled to the trigger means for triggering said computing.

6. A data processing circuit according to claim 1, comprising a program execution unit having an instruction for activating said trigger means.

7. A data processing circuit according to claim 6, wherein the program execution unit is programmed with one or more event handling programs, the program execution unit being arranged to execute said instruction only if none of the one or more event handling programs is executing.

* * * * *